United States Patent [19]

Keeney

[11] Patent Number: 4,469,125

[45] Date of Patent: Sep. 4, 1984

[54] QUICK RELEASE VALVE

[75] Inventor: Michael G. Keeney, Tonawanda, N.Y.

[73] Assignee: C. H. Heist Corporation, Clearwater, Fla.

[21] Appl. No.: 331,143

[22] Filed: Dec. 16, 1981

[51] Int. Cl.³ .......................................... F16K 17/00
[52] U.S. Cl. ...................................... 137/467; 251/72
[58] Field of Search .................. 251/72, 73, 74, 280; 137/505.11, 271, 464, 465, 467

[56] References Cited

U.S. PATENT DOCUMENTS

| | | | |
|---|---|---|---|
| 166,567 | 8/1875 | Steele | 137/505.11 |
| 1,380,867 | 6/1921 | De Bolotoff | 251/280 |
| 2,973,776 | 3/1961 | Allen | 137/467 |
| 2,973,777 | 3/1961 | Troxell | 137/467 |
| 3,906,983 | 9/1975 | Parkison | 137/467 X |
| 4,082,104 | 4/1978 | Keeney | 137/271 |

Primary Examiner—Martin P. Schwadron
Assistant Examiner—Stephen M. Hepperle
Attorney, Agent, or Firm—Joseph P. Gastel

[57] ABSTRACT

A quick release valve including a housing, a high pressure fluid inlet in the housing, a fluid outlet in the housing, a first plunger having a valve member at a first end thereof, a second annular plunger axially aligned with the first plunger and having a seat on the end thereof for receiving the valve member, a toggle linkage mounted between the housing and the second end of the first plunger for maintaining the valve member on the seat when the toggle linkage is overcenter but permitting the valve member to pull away from the seat when the toggle linkage is broken, and a lever with a weight thereon attached to the toggle linkage for biasing the toggle linkage to a broken condition but which is ineffective for doing so when the toggle linkage is in an overcenter position as a result of fluid pressure being exerted on the valve member.

7 Claims, 7 Drawing Figures

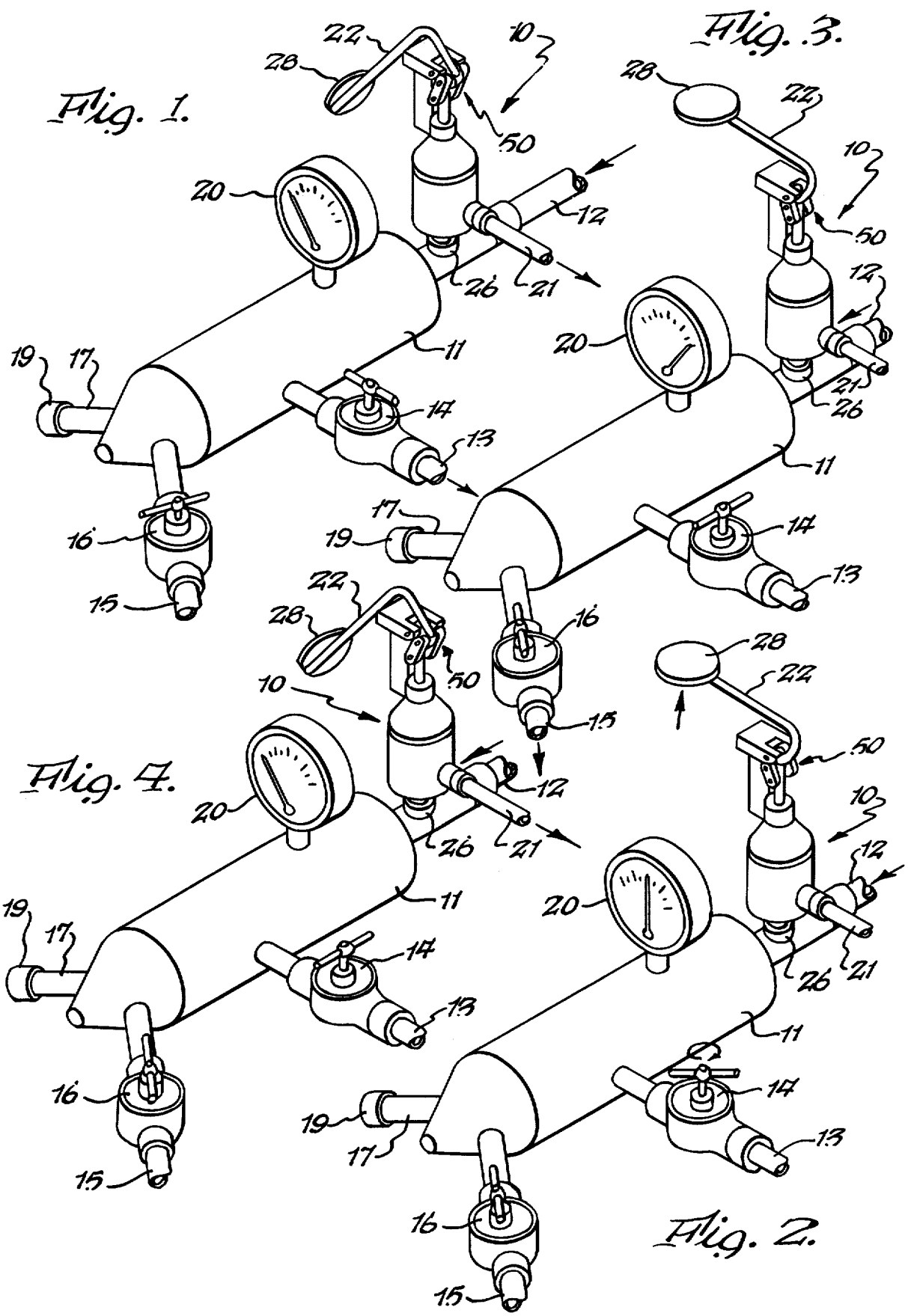

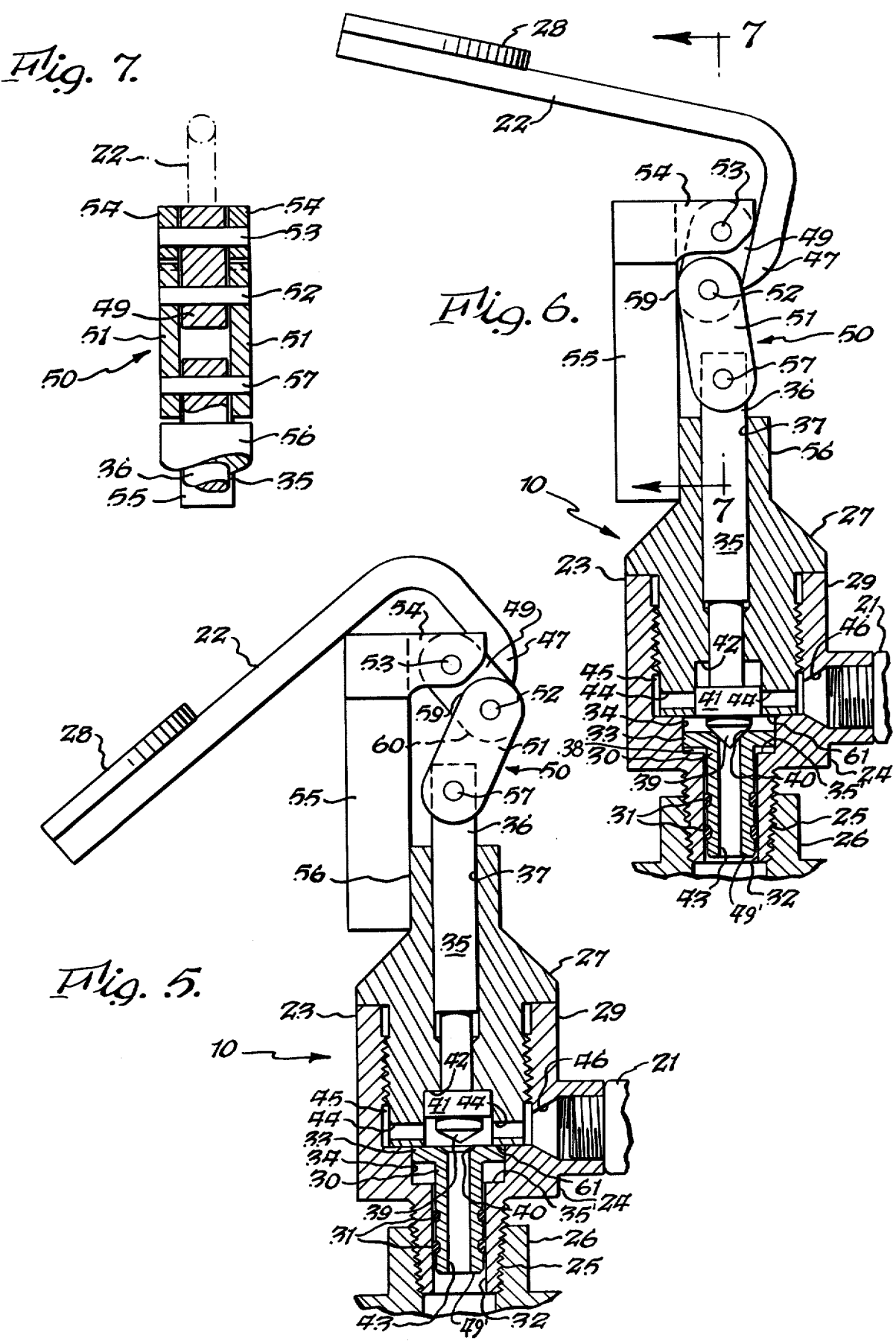

QUICK RELEASE VALVE

BACKGROUND OF THE INVENTION

The present invention relates to an improved quick release valve for use in applications where flow of high pressure fluid must be terminated quickly.

By way of background, there are numerous applications wherein high pressure fluid flow must be terminated quickly. One of these applications is where high pressure water of the magnitude of between 5,000 and 10,000 pounds per square inch is being supplied to a cleaning lance carried by an individual and directed at an area which is to be cleaned. In certain instances, there may be a drop in water pressure due to some external occurrence, such as a truck running over the main high pressure water supply line. In such a situation, the lance operator many times relaxes his hold on the lance and then when the flow of high pressure liquid resumes, he loses control of the lance. This may result in very great injury to the operator and to equipment in the vicinity of the lance. In the past there was no known simple way of quickly and automatically terminating flow of high pressure liquid to the lance in the event of a pressure drop. In addition, in the past it has always been necessary to have a quick release valve in the line for dumping high pressure liquid in the event of an emergency. These valves were subject to various shortcomings including complexity and the structural limitation that the high pressure liquid always tended to be exerted in a direction tending to open the valve. Therefore, the possibility existed that if the valve was not completely closed, there could be leakage. It is with overcoming the foregoing deficiencies of the prior art that the present invention is concerned.

SUMMARY OF THE INVENTION

It is one object of the present invention to provide a quick release valve which will remain in a closed condition as long as it is subjected to high pressure fluid but which will automatically move to an open position upon a drop in fluid pressure.

Another object of the present invention is to provide an improved quick release valve in which the greater the pressure, the greater will be the seating of the valve elements therein but which will permit instantaneous release of the high pressure upon a simple manual manipulation of a lever associated with the valve. Other objects and attendant advantages of the present invention will readily be perceived hereafter.

The present invention relates to a quick release valve comprising a housing, a high pressure fluid inlet in said housing, a fluid outlet in said housing, valve means in said housing in communication with said high pressure fluid inlet for selectively permitting or preventing communication between said fluid inlet and said fluid outlet when said valve means are open or closed, respectively, and means coupled to said valve means for maintaining said valve means in a closed position when said valve means are exposed to high fluid pressure and causing said valve means to open in response to the interruption of said high fluid pressure.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of the improved quick release valve of the present invention mounted on a gauge board which receives high pressure fluid and directs it either to the device, such as a lance, or to a dumping area, the quick release valve and a dumping valve being shown in positions wherein they dump the high pressure fluid;

FIG. 2 is a view similar to FIG. 1 but showing both the dumping valve closed and the quick release valve in a position wherein it permits high pressure fluid to be supplied through the gauge board to a lance or the like;

FIG. 3 is a view similar to FIG. 2 and showing the main dump valve closed, the valve to the lance open, and the quick release valve in a position which it assumes when it dumps the high pressure fluid;

FIG. 4 is a view similar to FIG. 3 but showing the manner in which the gauge board and quick release valve are reset from the position in FIG. 3 to continue supplying high pressure fluid to a lance;

FIG. 5 is a fragmentary cross sectional view partially in side elevation, showing the mechanism of the quick release valve and also showing it in an open position wherein it permits fluid to pass therethrough;

FIG. 6 is a view similar to FIG. 5 but showing the quick release valve in a closed position wherein it prevents flow of fluid therethrough; and FIG. 7 is a fragmentary cross sectional view taken substantially along line 7—7 of FIG. 6.

DESCRIPTION OF THE PREFERRED EMBODIMENTS

Summarizing briefly in advance, the improved quick release valve 10 of the present invention is intended for use in applications where high pressure fluid, such as high pressure water, is to be supplied to a lance or other device and where it is desired to terminate high pressure fluid flow immediately either by a positive act on the part of an operator or automatically in response to a drop in fluid pressure. In the latter respect, whenever a high pressure water lance is being used by a workman for cleaning purposes, great effort is involved in controlling the lance because of the reactive force of the high pressure water emanating therefrom at pressures of between 5,000 and 10,000 pounds per square inch. If there should be a momentary or longer drop in pressure, as might occur when a truck passes over the main supply hose, or for any other reason, the lance operator might momentarily relax, and he might not possibly be poised to control the lance upon the resurgence in pressure. This can lead to serious accidents because of his lack of control. The quick release valve of the present invention will automatically dump high pressure fluid upon a drop in line pressure, and thus prevent the resurgence of high pressure at the lance, until the quick release valve is manually reset. In addition, the quick release valve may be manually actuated, if desired, to positively and immediately prevent the flow of high pressure fluid to a device.

In FIG. 1 the quick release valve 10 is shown mounted in conjunction with gauge board 11, which is essentially a liquid manifold which receives high pressure liquid, such as water, from conduit 12 (which is coupled to a suitable pump or other high pressure source) and conducts the high pressure fluid to a dumping area through conduit 13 when valve 14 is open, or to a lance connected to conduit 15 when valve 16 is open.

Conduit 17 is shown with a cap 19 thereon, and it will be appreciated that a valve, such as 16, can be mounted on conduit 17 for supplying high pressure liquid to another lance. A gauge 20 shows the pressure in manifold or gauge board 11.

In FIG. 1 the quick release valve is in the open position so that high pressure fluid coming through conduit 12 will pass through valve 10 and into conduit 21 and pass to a dumping area. In addition, valve 14 is open so that the high pressure fluid will also pass through conduit 13 to a dumping area. Valve 16 leading to conduit 15 is closed so that no high pressure fluid is conducted to the lance.

In FIG. 2 the various components associated with gauge board 11 are shown in the positions in which they assume when high pressure fluid is being provided to a lance connected to conduit 15. In this respect lever 22 of valve 10 is moved from the inclined position of FIG. 1 to the horizontal position of FIG. 2 to close valve 10 and thus terminate the flow through conduit 21. While lever 22 is being maintained in a horizontal position, valve 14 is closed gradually and valve 16 is opened gradually. Thus, the flow of fluid to conduit 13 is terminated and the high pressure fluid is thus passed from conduit 12 through manifold 11 and valve 16 to conduit 15.

From FIG. 3 it can be seen that valve 14 is ultimately closed while valve 16 remains open, and the existence of high pressure fluid to which valve 10 is exposed will cause lever 22 to remain in a horizontal position wherein the quick release valve 10 permits continued supply of high pressure fluid from conduit 12 to conduit 15.

From FIG. 4 it can be seen that lever 22 has returned to an inclined position from the horizontal position of FIGS. 2 and 3. This may have been due to either a drop in the pressure in conduit 12 or because for some reason the operator at the gauge board struck disc 28 on lever 22 to thus cause valve 10 to open and route high pressure fluid from conduit 12 to conduit 21 while main dump valve 14 remained closed and thus could not cause the high pressure fluid to be dumped through conduit 13. The fact that high pressure fluid is now being dumped through conduit 21 will drop the pressure of fluid in conduit 15 leading to the lance while valve 16 remains open.

The constructional details of valve 10 are shown in FIGS. 5, 6 and 7. The internal construction of valve 10 is essentially the same as shown in U.S. Pat. No. 4,082,104, issued Apr. 4, 1978, and this patent is incorporated herein by reference for all features which are common to the present construction. Valve 10 includes a housing 23 consisting of two parts, namely, the pressure end housing portion 24 having a threaded end 25 adapted to be screwed into conduit 26 which effects communication between conduit 12 and gauge board 11. Housing 23 also includes housing portion 27 which is screwed into tapped portion 29 of housing portion 24.

An annular plunger 30 having spaced O-rings 31 mounted thereon is located in bore 32 of housing portion 24. An annular flange 33 at the end of plunger 30 fits into enlaraged bore 34 in housing portion 24 with one side therof adjacent to annular shoulder 35'. O-rings 31 provide a fluid seal with bore 32. A second plunger 35 includes a cylindrical body portion 36 which is slidably received in bore 37 of housing portion 27. A conical face 39 is provided at the end of plunger 35 for sealing engagement with frustoconical seat 40 of plunger 30, as shown in FIG. 6. An annular collar 41 is formed on plunger 35 and when the valve 10 is open, collar 41 seats against shoulder 42. When valve 10 is in the open position of FIG. 5, fluid will pass through bore 43 in plunger 30, through the space between seat 40 and conical valve member 39 and through the radial holes 44 in valve member 27, into annular chamber 45, through conduit 46 and into conduit 21.

When it is desired to close valve 10, lever 22 is moved from the inclined position of FIG. 5 to the horizontal position of FIG. 6. The end 47 of lever 22 is attached to link 49 of toggle linkage 50, and link 49 is pivotally connected to link 51 by pin 52. Link 49 is pivotally connected by pin 53 to ears 54 mounted on block 55 which is secured to neck 56 of valve housing portion 27. Link 51 is pivotally connected to plunger 35 by pin 57. When lever 22 is in the horizontal position of FIG. 6, toggle links 49 and 51 will be in the overcenter position of FIG. 6 and will have moved plunger 35 downwardly so that conical end portion 39 thereof seats on valve seat 40. In this position a fluid seal will be provided between member 39 and seat 40 and annular collar 41 will block radial bores 44. High pressure fluid in conduit 32 will exert pressure against the annular end 49' of plunger 30 and on the portion of conical member 39 within bore 43. The higher the pressure, the greater will be the force tending to force the seat 40 of the annular member into engagement with conical valve member 39. Furthermore, the greater the force of fluid pressure, the greater will be the force on toggle linkage 50, and since the edges 59 of links 51 and the edge 60 of link 49 bear against block 55, the valve will remain in a closed position for as long as high pressure is exerted on annular portion 49' and conical portion 39.

If there should be a drop in line pressure in conduit 12, which is sensed in conduit 32 of valve 10, the weight of disc 28 and lever 22 will cause link 49 to pivot about pin 53 from the position shown in FIG. 6 to the position shown in FIG. 5. This will cause links 51 to move from the position shown in FIG. 6 to the position shown in FIG. 5 and this in turn will raise plunger 35 to the point where annular collar 41 moves up into abutting engagement with shoulder 42. A suitable clearance, not shown, between annular flange 33 and annular shoulder 35' permits the foregoing to occur. In addition, the limit of upward movement on annular portion 33 of plunger 30 will be as shown in FIG. 5 wherein it abuts shoulder 61 of housing portion 27. Thus, there will be the space between conical member 39 and seat 40 so that any subsequent high pressure fluid in conduit 32 will be passed through the open valve into conduit 21.

In addition to the foregoing, lever 22 can be moved manually from the position shown in FIG. 6 to the position shown in FIG. 5 by merely striking disc 28 at the end of lever 22 to move the latter toward the position of FIG. 5. As soon as the toggle linkage 50 has moved so that the center of pin 52 lies slightly to the right of the line joining pins 53 and 57, the high pressure in conduit 32 on conical member 39 will force it upwardly until collar 41 abuts shoulder 42 and plunger 30 will also move upwardly because of the pressure exerted on annular end 49' until flange 33 abuts shoulder 61. The advantage of having two valve parts strike different portions of the valve housing reduces the shock on the valve housing and thereby permits valve housing 23 to be made relatively small inasmuch as relatively small impacts can be absorbed by a relatively small housing. This is explained in detail in the above-mentioned U.S. Pat. No. 4,082,104.

The length of lever 22 is such that when gauge board valve 14 is closed, lever 22 cannot be manually moved from the inclined position of FIG. 5 to the horizontal position of FIG. 6 because of the force exerted by high pressure fluid on the valve 39, and thus high pressure cannot be supplied to conduit 15. If it is desired to supply high pressure to conduit 15 when valve 14 is closed, it is first necessary to open valve 14 to permit high pressure fluid to pass into conduit 13, thereby lessening the pressure within gauge board 11. This will permit lever 22 to be raised from the inclined position of FIG. 5 to the horizontal position of FIG. 6. Thereafter, valve 14 can be closed gradually while lever 22 is maintained in a horizontal position until the pressure in gauge board 11 is built up to the point where the pressure in valve conduit 32 will cause valve seat 40 to remain in seated relationship with conical valve portion 39.

While preferred embodiments of the present invention have been disclosed, it will readily be appreciated that the present invention is not limited thereto but may be otherwise embodied within the scope of the following claims.

What is claimed is:

1. A quick release valve for remaining closed while subjected to high pressure fluid and automatically opening upon sensing an interruption of said high pressure fluid comprising a housing, a fluid inlet in said housing, a fluid outlet in said housing, valve means in said housing in communication with said fluid inlet for selectively preventing or permitting communication between said fluid inlet and said fluid outlet when said valve means are in closed or open positions, respectively, and means coupled to said valve means for maintaining said valve means in said closed position solely in response to said valve means being exposed to high pressure fluid at said fluid inlet and causing said valve means to move to said open position and to maintain said valve means in said open position in response to said interruption of said high pressure fluid at said fluid inlet to cause fluid to flow through said fluid outlet upon the recurrence of high pressure fluid at said fluid inlet, said means coupled to said valve means comprising a plunger mounted in said housing and coupled to said valve means, a toggle linkage comprising first and second links, a first pivotal connection between said first and second links, a second pivotal connection between said first link and said plunger, a third pivotal connection effectively located between said second link and said housing, means for maintaining said toggle linkage in an overcenter position to maintain said valve means closed when said valve means are subjected to high pressure fluid, and biasing means for biasing said toggle linkage to a broken position from said overcenter position to move said valve means to an open position to place said fluid inlet in communication with said fluid outlet after said valve means are not subjected to said high pressure fluid.

2. A quick release valve as set forth in claim 1 wherein said biasing means comprises a weighted lever coupled to said second link for moving said toggle linkage to said broken position by gravitational force.

3. A quick release valve as set forth in claim 1 wherein said means for maintaining said toggle linkage in an overcenter position comprise an abutment on said housing.

4. A quick release valve for remaining closed while subjected to high pressure fluid and automatically opening upon sensing an interruption of said high pressure fluid comprising a housing, a fluid inlet in said housing, a fluid outlet in said housing, valve means in said housing in communication with said fluid inlet for selectively preventing or permitting communication between said fluid inlet and said fluid outlet when said valve means are in closed or open positions, respectively, and means coupled to said valve means for maintaining said valve means in said closed position solely in response to said valve means being exposed to high pressure fluid at said fluid inlet and causing said valve means to move to said open position and to maintain said valve means in said open position in response to said interruption of said high pressure fluid at said fluid inlet to cause fluid to flow through said fluid outlet upon the recurrence of high pressure fluid at said fluid inlet, said means coupled to said valve means comprising a plunger mounted in said housing and coupled to said valve means, a toggle linkage comprising first and second links, a first pivotal connection between said first and second links, a second pivotal connection between said first link and said plunger, a third pivotal connection effectively located between said second link and said housing, a lever coupled to said toggle linkage for moving said toggle linkage to an overcenter position for closing said valve means and for breaking said toggle linkage to open said valve means.

5. A quick release valve as set forth in claim 4 wherein said lever is weighted to cause said toggle linkage to move to a broken position after said interruption of the exposure of said valve means to said high fluid pressure.

6. A quick release valve for remaining closed while subjected to high pressure fluid and automatically opening upon sensing an interruption of said high pressure fluid comprising a housing, a fluid inlet in said housing, a fluid outlet in said housing, valve means in said housing in communication with said fluid inlet for selectively preventing or permitting communication between said fluid inlet and said fluid outlet when said valve means are in closed or open positions, respectively, and link means coupled to said valve means for maintaining said valve means in said closed position solely in response to said valve means being exposed to high pressure fluid at said fluid inlet and causing said valve means to move to said open position and to maintain said valve means in said open position in response to said interruption of said high pressure fluid at said fluid inlet to cause fluid to flow through said fluid outlet upon the recurrence of high pressure fluid at said fluid inlet, said valve means comprising first and second valve members which are subjected to said high fluid pressure, a plunger coupled to said first valve member and said link means for preventing movement of said first valve member when said link means are in a position to maintain said valve means in a closed position, and said second valve member being movable into sealing engagement with said first valve member upon exposure to said high fluid pressure.

7. A quick release valve comprising a housing, a fluid inlet in said housing, a fluid outlet in said housing, valve means in said housing in communication with said fluid inlet for selectively permitting or preventing communication between said fluid inlet and said fluid outlet when said valve means are open or closed, respectively, and means coupled to said valve means for maintaining said valve means in a closed position solely in response to the exposure of said valve means to high pressure fluid and for causing said valve means to open on the interruption of said high pressure fluid and for selectively opening said valve means by manual actuation during the existence of high pressure fluid in said fluid inlet, said means coupled to said valve means comprising a toggle linkage, and a weighted lever coupled to said toggle linkage to move said valve means to said open position on the interruption of said high pressure fluid and to also move said toggle linkage to open said valve means upon said manual actuation in opposition to said high pressure fluid at said inlet.

* * * * *